// 106-85.
12-2-75    AU 115    EX
           XR    3,923,534

United States Patent [19]
Cassidy

[11] 3,923,534
[45] Dec. 2, 1975

[54] COLD-SETTING REFRACTORY COMPOSITIONS

[75] Inventor: John Edward Cassidy, Runcorn, England

[73] Assignee: Imperial Chemical Industries Limited, London, England

[22] Filed: May 14, 1973

[21] Appl. No.: 360,186

[30] Foreign Application Priority Data
May 22, 1972  United Kingdom............... 23885/72
Jan. 22, 1973  United Kingdom................ 3174/73

[52] U.S. Cl. ..................... 106/62; 106/65; 106/85
[51] Int. Cl.² ......................................... C04B 35/66
[58] Field of Search........................ 106/85, 65, 62

[56] References Cited
UNITED STATES PATENTS

| | | | |
|---|---|---|---|
| 2,116,910 | 5/1938 | Piccard................................ | 106/85 |
| 2,450,952 | 10/1948 | Greger................................ | 106/85 |
| 2,455,758 | 12/1948 | Greger................................ | 106/85 |
| 2,466,138 | 4/1949 | Wainer................................ | 106/85 |
| 3,730,744 | 5/1973 | Yavorsky............................ | 106/85 |

*Primary Examiner*—J. Poer
*Attorney, Agent, or Firm*—Cushman, Darby & Cushman

[57] ABSTRACT

A cold setting refractory composition comprises a water-soluble aluminum phosphate binding agent, refractory filler and, as setting agent, magnesia of low reactivity.

11 Claims, No Drawings

COLD-SETTING REFRACTORY COMPOSITIONS

This invention relates to cold-setting refractory compositions.

The use of soluble aluminium phosphates as binding agents for refractory materials, for example in refractory mortars, cements and concretes, has been described in the literature. Generally, the binding agents have been set by heating, although the use of magnesium oxide to coldset binding agents derived from alumina and phosphoric acid has been suggested. However, the previous proposals have suffered from disadvantages. In some cases, heating and grinding steps have been required during the formulation of the refractory composition. In some cases, it is found in practice that the binding agent sets too rapidly, so that the pot life of the mixed refractory composition is shorter than desired; as a result, new mixes have to be made up at frequent intervals. Moreover, large jobs may have to be done in a number of stages, a new mix being prepared for each stage.

Surprisingly, we have found that the disadvantages of the prior art can be overcome or at least substantially alleviated, without the need to change to another setting agent, by careful selection of the kind of magnesia used.

According to the present invention there is provided a add-setting composition comprising water, refractory filler, a water-soluble aluminium phosphate binding agent, and, as setting agent, magnesia of low reactivity.

If a reactive form of magnesia, for example, unburnt precipitated magnesia, is used, the composition sets very rapidly and there is usually insufficient time to shape the composition into a desired form. However, the use of magnesia of low reactivity permits a controlled set giving satisfactory initial strength (green strength) in the set refractory product, and good strength in the final product which may be obtained on subsequent heating to high temperatures. By selecting magnesia of low reactivity, the setting time of the composition may be extended to a period of hours or even days. The extended setting time allows the material to be shaped into the desired form, for example, by casting.

The reactivity of the magnesia depends on its surface area. Thus a convenient empirical way of expressing the reactivity of magnesia is to express it in terms of the surface area of the magnesia. Magnesia of low reactivity (i.e. used in the present invention) generally has a surface area of less than 5 square metres/ gram measured by the Rigden method. The particular grade of magnesia selected will depend upon the setting time required, but it is generally preferred to use magnesia having a surface area below 2 square metres/gram. Where it is desired to increase the setting time still further, the use of magnesia having a surface area of less than 0.5 square metres/gram is advantageous.

Examples of forms of magnesia that may be used include the so-called fused magnesia, and hard-burnt natural or precipitated magnesia.

The magnesia used is conveniently in finely-divided form, and consequently, if fused magnesia is used, it will generally be ground before use. It is preferred that the median particle size of the magnesia be less than 200 μm and especially in the range 20 to 100 μm. However, magnesia of greater or smaller median particle size may be used if desired.

The hot amongst of refractory products formed from the composition depends on, amonst other factors, the purity of the magnesia. To obtain good hot strength it is generally desirable to minimise the concentration of fluxing impurities such as $SiO_2$, $Fe_2O_3$, $Na_2O$ and $CaO$ present in the magnesia. The magnesia used preferably is at least 90% pure and it is especially preferred that the magnesia be at least 98% pure.

A preferred form of magnesia is the fused ground product available in commerce under the designation Magnorite 100 F.

The setting time of the composition is also influenced by pH; the higher the pH, the shorter the setting time. Chloride ion, if present, increases the setting time.

Any water-soluble aluminium phosphate binding agent may be used, for example the acid ortho-phosphates $Al_2(HPO_4)_3$ and $Al(H_2PO_4)_3$, and mixtures containing them.

The water-soluble complex phosphates containing aluminium and phosphorus in a ratio of substantially 1:1 (for example 0.8:1 to 1.2:1) give especially good results when used in the practice of the invention. The complexes contain the anion of a mineral acid (other than an oxyphosphorus acid) or a carboxylic acid, for example, citric acid. The solid complexes generally also contain chemically-bound water and/or chemically-bound alcohol.

The complexes containing halogen as the anion are described below and in our copending application No. 29,862/69 (Dutch Patent Application No. 7,008,594) which corresponds to U.S. patent application Ser. No. 274,964.

The complex phosphates containing anionic groups other than halides are analogous to the halogen-containing complexes and may be prepared and used as binders in analogous ways. Further details of these complexes are given below and in our copending U.S. patent application Ser. Nos. 296,985 (containing chemically-bound water) and U.S. patent application Ser. No. 296,983 (containing a chemically-bound organic hydroxy compound).

When the anion is a halogen, it is preferably chlorine, but the complexes may contain other halogens, for example, bromine. Examples of other preferred anions which may be present are the anions of mineral oxyacids especially monobasic oxyacids, for example nitric acid.

The solid complex phosphates generally contain, for example, from three to five molecules of the hydroxy compound per phosphorus atom, for example, the water-containing complexes having an empirical formula corresponding to $AlPO_4 \cdot HCl \cdot (H_2O)_x$ where $x$ is in the range 3 to 5. For convenience, these complexes are hereinafter referred to as ACPH.

The complex phosphate may be prepared by, for example, reacting an aluminium salt containing the desired anion, for example the halide or nitrate, with water (or an alcohol) and phosphoric acid; or by mixing aluminium phosphate with an aqueous acid containing the desired anion; or, for example, by treating aluminium phosphate hydrate with gaseous hydrogen chloride or nitrogen dioxide. When the complex phosphates are prepared in solution they may conveniently be separated in the solid form by spraydrying the solution as described in copending U.S. patent application Ser. No. 296,984. (Dutch Patent Application No. 7,214,145).

The magnesia will generally be used in a minor proportion, based on the weight of magnesia plus aluminium phosphate binding agent, since the use of larger proportions is generally unnecessary and may result in an over-rapid set. Thus, the amounts of the components will generally be chosen to give a ratio of magnesia to aluminium phosphate binding agent of 1:200 to 1:1, preferably 1:50 to 1:3, and usually 1:10 to 1:2, on a weight:weight basis.

The refractory filler is preferably an acid or neutral refractory filler. Silica, alumina (for example calcined alumina, tabular alumina and bubble alumina) and zirconia are especially useful as refractory fillers, as are aluminium and zirconium silicates. Further examples of refractory fillers which may be used include mica, mullite and molochite. Two or more fillers may be used if desired. Fillers consisting of mixtures of coarse and fine particles are preferred since the strengths of the products obtained using such mixtures are generally higher than when all the filler particles used are of similar size. In the production of refractory cements and castables, only a small proportion of binding agent, relative to the refractory filler, is generally necessary. For example, the binding agent may be used in an amount of 1 to 25% by weight, especially 2 to 10% by weight, based on the weight of the refractory filler, although quantities of binding agent above or below these limits may be used.

The amount of water in the composition depends on the consistency required which, in turn, depends on the use for which the composition is intended. For example, a thinner mix will generally be used for a mortar than for a concrete. Usually, there will be sufficient water present to dissolve at least a major proportion (and preferably all) the aluminium phosphate binding agent. For example, the composition will generally contain between 1 and 30%, preferably between 4 and 20%, by weight of water based on the weight of refractory filler.

The aqueous compositions of the invention may be prepared in any desired manner. It is especially convenient to first prepare a solid mix (or cement) of the aluminium phosphate (especially a complex phosphate containing aluminium and phosphorus in a ratio of substantially 1:1) and the magnesia, and optionally the refractory filler. On admixture with water to give the required consistency (and, if not already present, the refractory filler) the mixture sets, without the application of heat, to a solid material.

Solid compositions containing the aluminium phosphate binder and magnesia setting agent are conveniently prepared by mixing the components in the form of dry, finely-divided solids. The solids are preferably blended together under dry conditions, e.g. by tumble-blending and/or grinding together, and then used or bagged for transport or storage.

Another convenient method of preparing compositions of the present invention is to make up a slurry of refractory filler in a solution of the aluminium phosphate binding agent. Then, when the composition is to be used, the magnesium oxide can be added and mixed in. By way of further example, the composition can be prepared by mixing the magnesia with the refractory filler and subsequently combining the solid mix with a solution of the aluminium phosphate binding agent. If desired, a combination of the above techniques may be used. For example, a portion of the refractory filler can be premixed with the magnesia, whilst further refractory filler is used to form a slurry with a solution of the aluminium phosphate binding agent; when the composition is to be used, the two pre-mixes are combined.

Thus, according to a further aspect of the invention there is provided a partially mixed cold-setting composition in at least two packs, a first pack containing an aqueous solution of aluminium phosphate binding agent and a second pack containing magnesia of low reactivity so that, on mixing the contents of the packs, there may be obtained a cold-setting composition in accordance with the invention. The refractory filler may be present in a third pack; in this case the only pre-mixing is the preparation of the solution of aluminium phosphate binding agent. However, it is generally most convenient to include the refractory filler in one or both of the other packs described above. Generally, the packs will be accompanied by instructions explaining that the contents of the packs should be mixed together in appropriate proportions to provide the cold-setting compositions of the invention.

The wet composition of the invention may be used, for example, in concrete mixes, as a mortar or grouting or as a castable composition, for example in the production of refractory bricks. Examples of areas in which cements and/or concretes in accordance with the invention may be useful are torpedo ladles, blast furnace runners, desulphurising systems, cement kilns, lime kilns, sliding gate nozzles and petrochemical plants.

The set materials have considerable mechanical strength and good slag resistance properties, especially when an aluminium phosphate having an Al:P ratio of substantially 1:1 is used. The mechanical strength of the set material increases on subsequent heating, for example, heating in use.

A wide range of other additives may be incorporated into the compositions of the invention. Surface-active agents may be added to aid wetting. Pigments and/or non-refractory fillers may be added if desired. Plasticisers are useful when the wet composition is used as a ramming or gunning mix, for example, bentonite and other clays or substitues therefor, for example cellulose derivatives. Clays may also be added to increase the hot strength of the final product. Corrosion inhibitors may be useful in some circumstances. Foaming agents may be used to give a foamed product. Similarly void-forming materials such as fly ash or foamed polymer chips may be included to reduce density or decrease thermal conductivity. Sources of alumina or calcium oxide may be added to improve refractory properties.

In this specification and claims, the proportions of magnesia, aluminium phosphate binding agent and refractory filler present in the compositions are referred to in terms of the weight of aluminium phosphate binding agent. When a solid aluminium phosphate binding agent is used, the weight of the binding agent is the weight of the solid used. However, when the aluminium phosphate binding agent is supplied in solution form, it may be difficult to assess the weight of the aluminium phosphate binding agent in the solution; in such cases (for the avoidance of doubt) the weight of the binding agent may be calculated as the weight of the aluminium plus phosphate (including acid phosphate) components thereof.

The invention is illustrated but not limited by the following Examples in which all parts are by weight.

EXAMPLE 1

100 parts of a refractory grog comprising 33⅓ parts <325 mesh tabular alumina, 33⅓ parts 24-48 mesh tabular alumina and 33⅓ parts 8-14 mesh tabular alumina were mixed with 5 parts of ACPH (as defined above) and 0.2 parts of 'Magnorite 100 F', a commercially available ground fused magnesia having a surface area of <0.5 square metres/gram and a median particle size of 76 μm. To this mixture 8 parts of water were added. The resulting slurry was thoroughly mixed and samples cast in cylindrical steel moulds (1¼ long × 1¼ inches diameter) lined with vaseline.

The procedure was repeated using varying proportions of magnesia and the setting time and compressive strengths after standing at room temperature for various intervals noted. The results are shown in Table 1.

Table 1

| Parts magnesia 100 parts grog | Setting time (hours) | Compressive Strength (lb/sq. inch) | | |
|---|---|---|---|---|
| | | after 24 hours | after 4 days | after 5 days |
| 0.20 | 24-30 | 86 | 212 | 267 |
| | | after 17 hours | after 4 days | after 5 days |
| 0.30 | <17 | 140 | 404 | 302 |
| | | after 6 hours | after 25 hours | after 5 days |
| 0.40 | 6 | 108 | 334 | 381 |
| | | after 6 hours | after 27 hours | after 5 days |
| 0.48 | 4-5 | 161 | 318 | 368 |

EXAMPLE 2

100 parts of a refractory grog containing 33⅔ parts <325 mesh tabular alumina, 32⅔ parts 24-48 mesh tabular alumina, 32⅔ parts 8-14 mesh tabular alumina and 2 parts Hywhite alum clay were mixed with 7.5 parts of ACPH (as above defined) and 0.6 part of a magnesium oxide sample. 8 parts of water were added to the mixture. The resulting slurry was cast into cylindrical moulds and the setting time noted. Further samples of the slurry were cast in rectangular steel moulds 4 × ½ × ½ inches to give samples suitable for modulus measurements.

The procedure was repeated using different magnesium oxide samples and the setting time noted and hot moduli determined. The results are shown in Table 2, which also gives details of the magnesium oxide setting agents used.

Table 2

| Magnesium Oxide Setting Agent | Setting Time | Hot Strength (at 1000°C) | MgO Content % | Surface Area M²/g (Rigden method) | Median Particle Size μm |
|---|---|---|---|---|---|
| Calcined sea water magnesia[1] | 7-8 hrs | Good | 91-93% | Not detected* | ** |
| Fused magnesia[2] | 6-8 hrs | V Good | 98% | <0.5 | 76 |
| Fused Magnesia[3] | 3 days | — | 98% | <0.5 | 390 |
| Fused Magnesite[4] | 1½-2 hrs | Good | 94% | 1.7 | 23 |
| ⁺Analar | 1 minute | | >99% | 8.9 | 10.5 |
| ⁺Sea water Magnesia | 1 minute | | 94% | 12 | — |
| ⁺Magnesium oxide[5] | <1 minute | | — | 72 | — |

[1] Available commercially as Britmag 215
[2] Available commercially as Magnorite 100F
[3] Available commercially as Magnorite 30-90
[4] Available commercially as Lycal 93
[5] Available commercially as Magnesium oxide A (Anchor Chemicals)
*The surface area of this sample was measured by an air permeability method and found to be 580 cm²/gram.
**Large variation in particle size.
⁺Comparative examples.

EXAMPLE 3

This Example illustrates the use of Magnorite 100 F, as described in Example 1, as a cold-setting agent for compositions containing different aluminium phosphate binding agents.

In each experiment, graded tabular alumina aggregates were mixed with Magnorite 100 F and (except in experiment 1) high alumina ball clay. In experiments 1-4, the solid aluminium phosphate binding agent was included in the mix, and water was added to the mixture. In experiment 5 10 parts of a 26% by weight solution of aluminium orthophosphate ($AlPO_4$) in dilute hydrochloric acid was added to the solid mix. In experiment 6, 4.5 parts of a 48% by weight solution of $Al(H_2PO_4)_3$ in water, together with 3 parts water (to make the mixture workable), were added to the solid mix. In each experiment, the mixture obtained was cast into rectangular moulds 4 × 1 × 1 inches.

The results obtained are shown in Table 3.

Table 3

| Experiment | 1 | 2 | 3 | 4 | 5 | 6 |
|---|---|---|---|---|---|---|
| Graded alumina aggregates (parts) | 100 | 96 | 98 | 98 | 96 | 96 |
| Ball clay (parts) | 0 | 4 | 2 | 2 | 4 | 4 |
| Aluminum phosphate binding agent (parts) | 5¹ | 5¹ | 7.5¹ | 7.5² | 10 (×26%) | 4.5 (×48%) |
| Magnorite 100 F (parts) | 0.4 | 0.4 | 0.6 | 0.45 | 0.4 | 0.4 |
| Water (parts) | 8 | 8 | 8 | 9 | 0 | 3 |
| Setting time (hours) | 6 | 24 | 12 | 3 | 6 | 6 |
| Hot modulus of product (lb/in²) at 600°C | 1304 | 800 | 1500 | 1400 | 825 | 1266 |

Table 3-continued

| Experiment | 1 | 2 | 3 | 4 | 5 | 6 |
|---|---|---|---|---|---|---|
| at 1000°C | 160 | 750 | 1400 | 250 | 950 | 734 |

[1]ACPH (as defined herein)
[2]A water-soluble solid complex phosphate binder of approximate formula $AlPO_4.HNO_3.xH_2O$ where x is about 3.

What we claim is:

1. A cold-setting refractory composition comprising water, refractory filler, a water-soluble complex aluminum phosphate binding agent containing aluminum and phosphate in a molar ratio of Al:P of substantially 1:1 and the anion of a carboxylic acid or of a mineral acid other than an oxyphosphorus acid and, as setting agent, magnesia of low reactivity, the ratio of magnesia to complex aluminum phosphate binding agent in the composition being in the range 1:200 to 1:1 by weight and the binding agent being present in a proportion of 1 to 25% by weight of the refractory filler.

2. A composition as claimed in claim 1 wherein the complex phosphate contains a mineral acid anion.

3. A composition as claimed in claim 2 wherein the complex phosphate contains chloride ion.

4. A composition as claimed in claim 1 wherein ground fused magnesia is used.

5. A composition as claimed in claim 1 wherein hard-burnt natural or precipitated magnesia is used.

6. A composition as claimed in claim 1 in which the ratio of magnesia to complex aluminum phophate binding agent is in the range 1:50 to 1:3.

7. A composition as claimed in claim 1 in which the magnesia has a surface area of less than 2 square metres/gram.

8. A composition as claimed in claim 1 in which the magnesia is at least 98% pure.

9. A dry powder composition comprising a solid water-soluble complex aluminum phosphate binding agent containing aluminum and phosphate in a molar ratio of Al:P of substantially 1:1 and the anion of a carboxylic acid or of a mineral acid other than an oxyphosphorous acid, and magnesia of low reactivity, the ratio of magnesia to complex aluminum phosphate in the composition being in the range 1:200 to 1:1 by weight, the dry powder composition providing, on the addition of water and refractory filler, a cold-setting composition as claimed in claim 1.

10. A composition as claimed in claim 9 wherein the magnesia has a surface area of less than 2 square metres/gram.

11. A composition as claimed in claim 9 wherein the magnesia is at least 98% pure.

* * * * *